No. 823,537. PATENTED JUNE 19, 1906.
J. H. KEFAUVER.
DOUGH RAISER.
APPLICATION FILED JUNE 30, 1905.
3 SHEETS—SHEET 1.
Fig. 1.
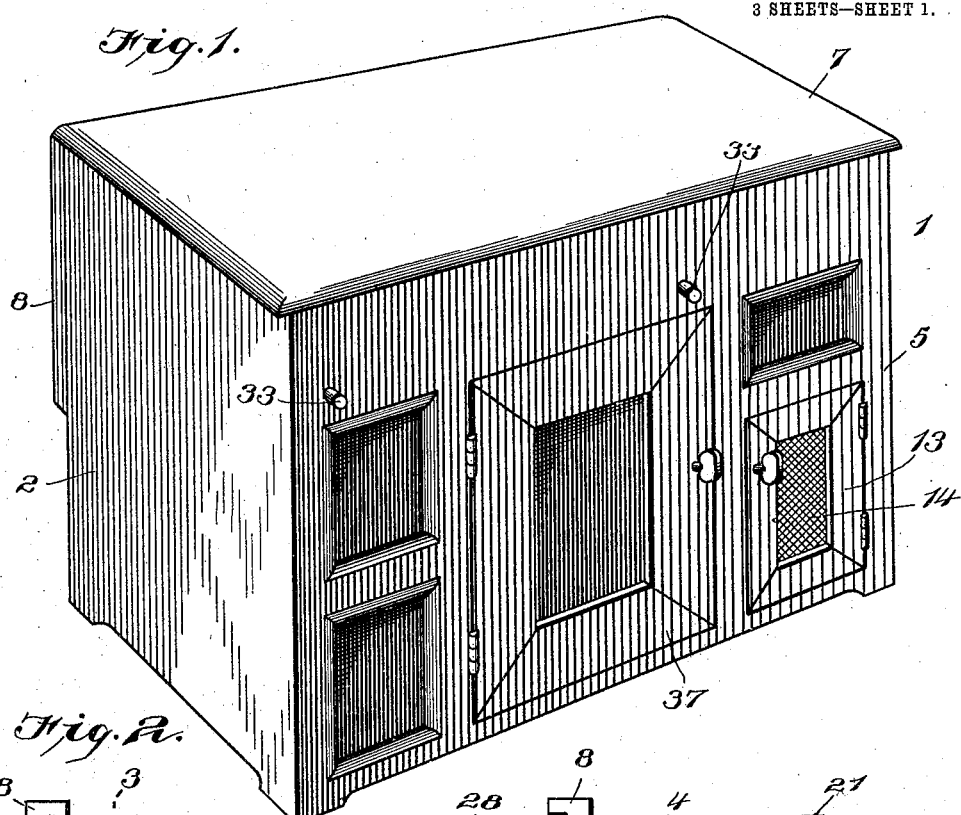
Fig. 2.
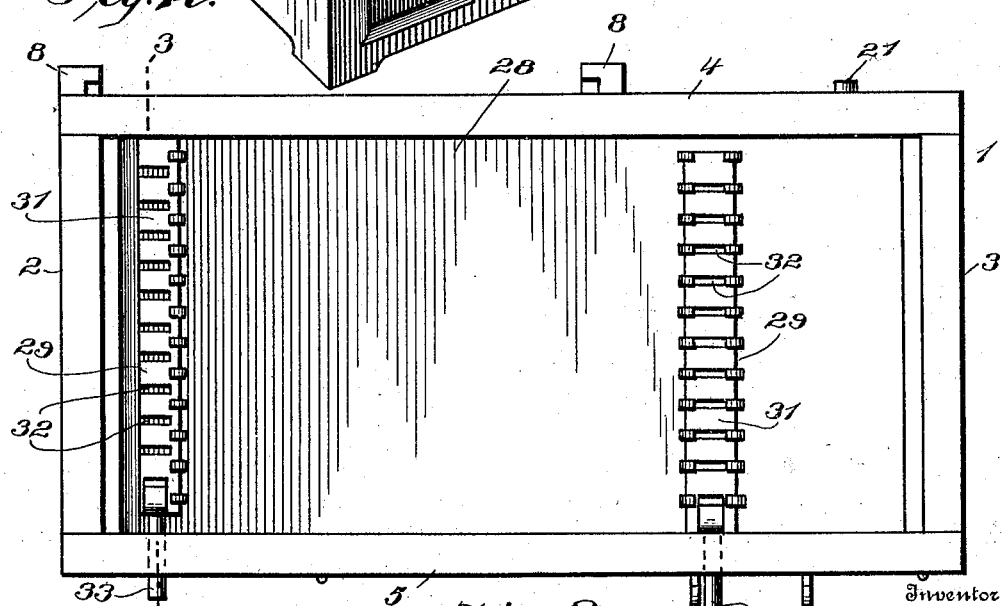
Fig. 3.
Witnesses
J. P. Britt
E. C. Duffy
Inventor
J. H. Kefauver
By
Attorney

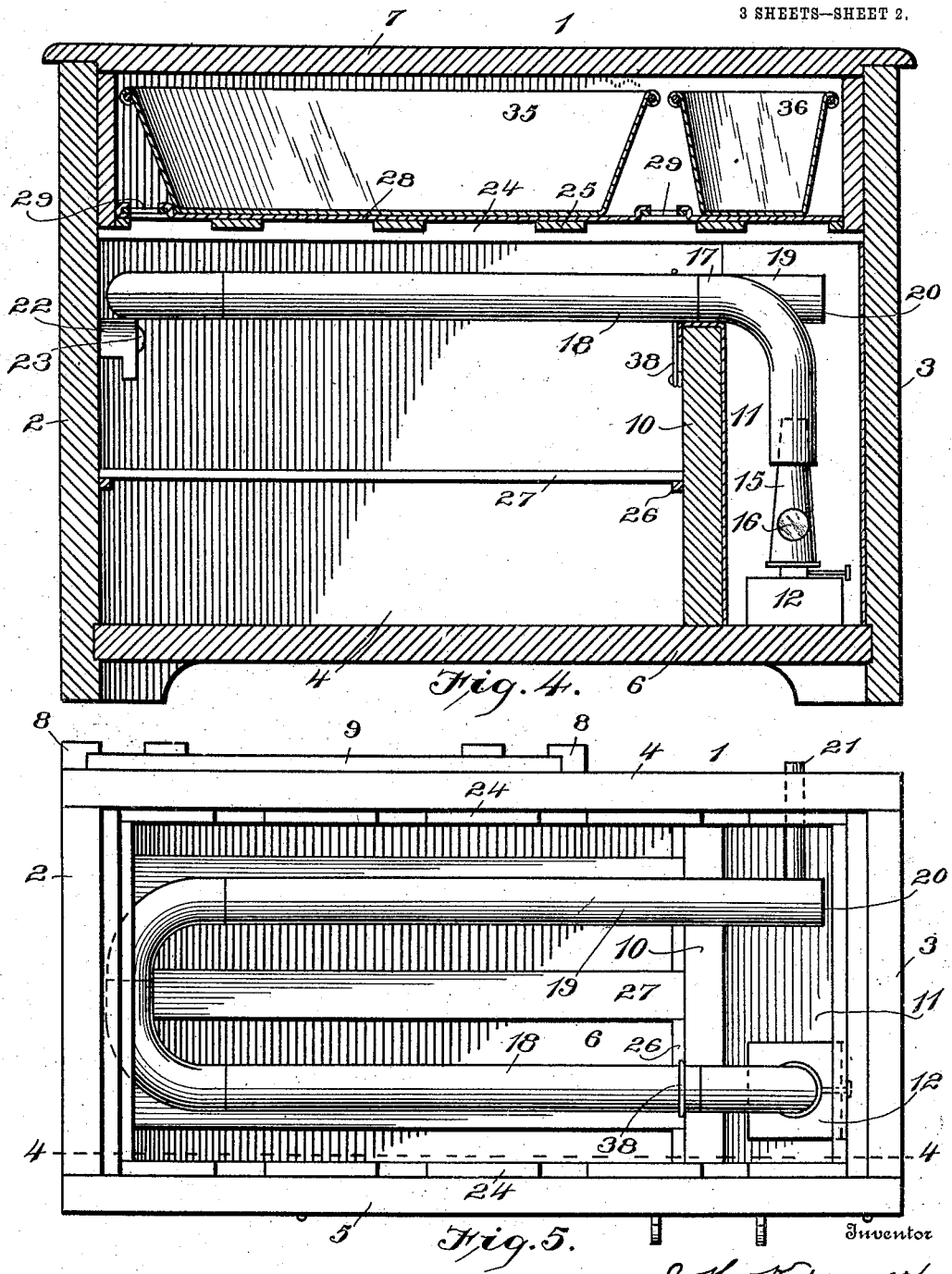

No. 823,537. PATENTED JUNE 19, 1906.
J. H. KEFAUVER.
DOUGH RAISER.
APPLICATION FILED JUNE 30, 1905.

3 SHEETS—SHEET 3.

Witnesses
J. P. Brett
E. C. Duffey

Inventor
J. H. Kefauver
By
Attorneys

UNITED STATES PATENT OFFICE.

JOSEPH HOLLIN KEFAUVER, OF MIDDLETOWN, MARYLAND.

DOUGH-RAISER.

No. 823,537.     Specification of Letters Patent.     Patented June 19, 1906.

Application filed June 30, 1905. Serial No. 267,858.

*To all whom it may concern:*

Be it known that I, JOSEPH HOLLIN KEFAUVER, a citizen of the United States, residing at Middletown, in the county of Frederick and State of Maryland, have invented certain new and useful Improvements in Dough-Raisers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to dough-raisers, and has for its object to provide a device of this class which is particularly simple in its construction, cheap to manufacture, durable, and efficient.

With this object in view my invention consists in the novel construction of the device which provides for heating the dough while the same is being kneaded and for heating the dough to assist in raising the same.

My invention also consists in the novel construction and arrangement of the heating-flue.

My invention also consists in certain other novel features of construction and in combinations of parts, which will be first fully described and afterward specifically pointed out in the appended claims.

Figure 6:
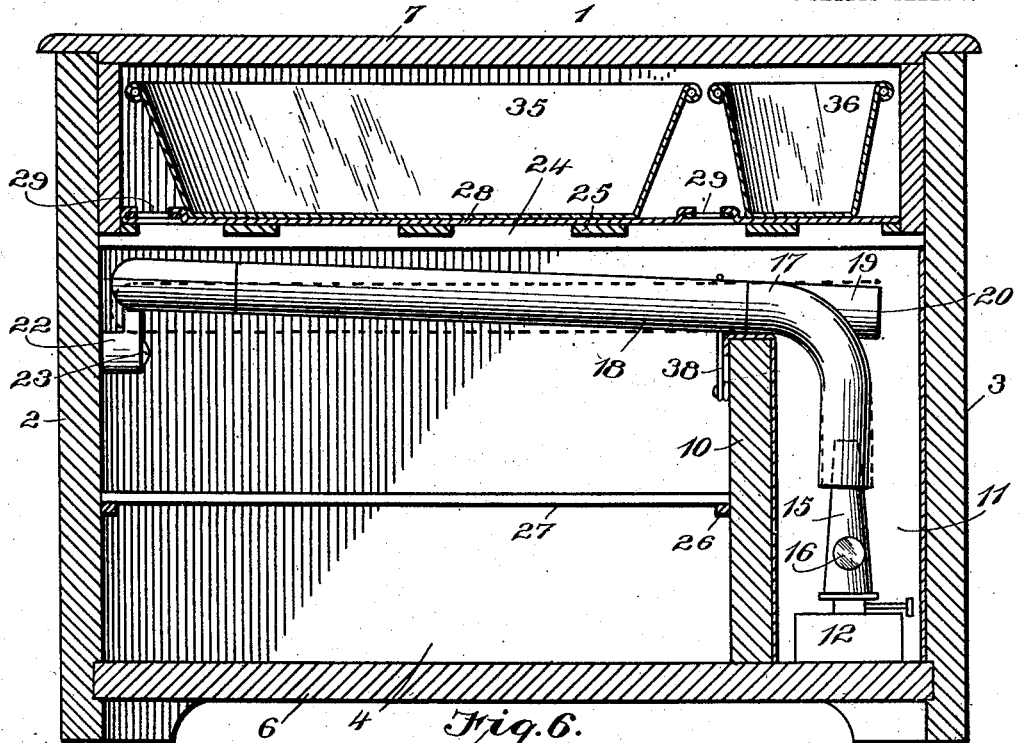
Figure 7:
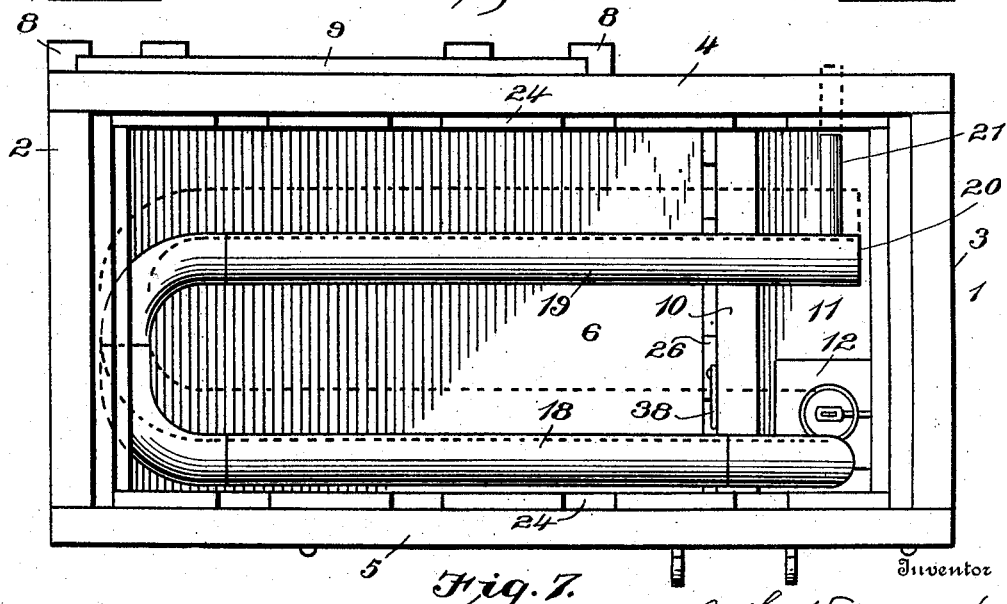

Referring to the accompanying drawings, Figure 1 is a perspective view of my device. Fig. 2 is a top plan with cover removed. Fig. 3 is a longitudinal sectional view through damper, taken on line 3 3 of Fig. 2. Fig. 4 is a vertical longitudinal section taken on line 4 4 of Fig. 5. Fig. 5 is a plan view with metallic partition and supporting-slats removed. Fig. 6 is a vertical longitudinal sectional view showing heating-flue raised in full lines and lowered in dotted lines. Fig. 7 is a plan view illustrating the heating-flue in position for removal, the upper and lower slats being removed.

Like numerals of reference indicate the same parts throughout the several figures, in which—

1 indicates the device, which comprises the two sides 2 and 3, the back 4, front 5, bottom 6, and removable top 7. Secured in the guides 8 on the back 4 is the bread-board 9, as shown in Figs. 5 and 7.

10 indicates a vertical transverse partition which forms one wall of the lamp-chamber 11, the remaining lower portion of the interior being the heating-chamber, and 12 indicates a heating-lamp, access being had to the former chamber and lamp through the small door 13 in the front 5, said door 13 being provided with an opening therein covered with mesh-wire 14, as shown in Fig. 1, so as to allow a view of the lamp without opening the door, the chimney 15 of the lamp being provided with a mica-covered opening 16, so as to make the flame visible from outside the device.

Resting on the top edge of the partition 10, as shown, is the heating-flue 17, having one end thereof extending down into the chamber 11 and over the top of the chimney 15. The said heating-flue is, as shown in Fig. 7, composed of two parallel sections 18 and 19, the section 18 extending from the chamber 11 longitudinally through the interior of the device to the side, the section 19 extending from said side 2 longitudinally through the interior of the device and entering the chamber 11, terminating at 20. Entering the heating-flue near the end 20 of the section 19 is an exhaust-pipe 21, which is of less diameter, said exhaust-pipe passing through the back 4 out into the air.

Secured to the side 2 is a cam 22, pivoted on a pin 23 and arranged to support the end of the heating-flue, as shown in Figs. 4 and 6. By means of this cam 22 the heating-flue can be raised into position shown in full lines in Fig. 6 or into any intermediate position in order to hold said flue closer to the partition 28 to increase the heat to the pan 35.

24 indicates a strip secured around the interior of the device for the purpose of holding the transverse supporting-slats 25, as shown in Figs. 4 and 5, and 26 two side strips located below said strip 24 for the purpose of holding the longitudinal supporting-slats 27, as shown in Figs. 4 and 5. 28 indicates a metallic partition which rests on said transverse slats 25, and, as shown in Figs. 2 and 3, said partition is provided with two dampers 29. A series of slots 30 are cut in the metallic partition 28, and the portions of the metal at the end of the slots is bent up, so as to allow the slide 31 to pass thereunder, said slide 31 being provided with a series of slots 32, spaced the same and of equal breadth as the slots 30 in the metallic partition 28, so as to register with said slots 30, while the front end of the slide 31 is bent up at right angles to said slide and provided with a perforation through which the reduced end of the damper-handle 33 passes. A pin 34 is then passed through said reduced end of the handle, so as to removably secure said handle to the damper-slide.

35 indicates the dough-pan, which rests upon the metallic partition 28 between the two dampers 29, and 36 indicates a smaller pan designed to hold flour.

37 indicates a door through which access is had to the interior of the device, and 38 indicates a wire yoke secured to the vertical transverse partition 10 and designed to engage the heating-flue to hold the same in position.

Having thus described the several parts of my invention, its operation is as follows: The dough is kneaded in the pan 35, and flour is kept in the smaller pan 36 to be used as required, the heat from the heating-flue passing up through the dampers 29, which are regulated by the damper-slides. After the dough is kneaded the pan 35 and dough are removed and placed on the lower slats 27 below the heating-flue, the said heating-flue being raised or lowered, as before described, and the dampers adjusted so as to properly regulate the heat on the rising dough. As shown in Fig. 6, the heating-flue is removable by releasing the yoke 38 and sliding the flue toward the front of the device, as shown in full lines. This draws the small exhaust-pipe out of the back 4 and allows the entire flue to be lifted out, the upper slats and metallic partition having been first removed, thus providing a cabinet which can be used for any desired purpose. By reason of the greatly-reduced size of the exhaust-pipe the heat from the lamp is confined a longer time within the heating-flue, while the exhaust-pipe is sufficiently large to insure a perfect draft. If desired, a thermometer can be conveniently arranged in the cabinet in order to exactly indicate the degrees of heat therein.

Having thus fully described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a dough-raiser, a cabinet having a lamp-chamber and a heating-chamber, a heating-flue formed of two parallel sections, and having the end of one section extending down into the lamp-chamber, and an exhaust-pipe entering said heating-flue near the end of the other section, substantially as described.

2. In a dough-raiser, a cabinet having a lamp-chamber and a heating-chamber, a heating-flue passing from said lamp-chamber to said heating-chamber, means arranged above said heating-flue for supporting the dough during the kneading, means arranged below said heating-flue for supporting the dough during the raising and means for raising or lowering said heating-flue, substantially as described.

3. In a dough-raiser, a cabinet having a lamp-chamber and a heating-chamber, a heating-flue passing from said lamp-chamber to said heating-chamber, a partition above said heating-flue to support the dough, and a damper in said partition to regulate the amount of heat passing from said heating-chamber, substantially as described.

4. In a dough-raiser, a cabinet having a lamp-chamber, a heating-chamber, a partition between the said chambers, a heating-flue above said partition and passing from said lamp-chamber to said heating-chamber, an exhaust-pipe passing from said heating-flue through the side of the cabinet, the said heating-flue being arranged above the said partition in such manner that it can be moved laterally to withdraw the said exhaust-pipe from the side of the cabinet to remove the said heating-flue from the cabinet, substantially as described.

5. In a dough-raiser, a cabinet having a heating-flue therein, means arranged above and below said heating-flue for supporting the dough, and means for raising and lowering said heating-flue, substantially as described.

6. In a dough-raiser, a cabinet having a heating-flue therein a partition arranged above said heating-flue for supporting the dough, a damper in said partition for regulating the heat passing to the dough and means arranged below said heating-flue for supporting the dough, substantially as described.

7. In a dough-raiser, a cabinet having a heating-flue arranged therein, means for supporting the dough within the cabinet, and an exhaust-pipe entering said heating-flue, said exhaust-pipe being of less diameter than the heating-flue in order to longer retain the heat in said heating-flue, substantially as described.

In testimony whereof I affix my signature in presence of two witnesses.

JOSEPH HOLLIN KEFAUVER.

Witnesses:
HERMAN L. ROUTZAHN,
L. M. ROUTZAHN.